Aug. 5, 1969  S. EPSTEIN  3,459,405

SPRING BIASED TAPERED PLUG VALVE

Filed May 11, 1966

SAUL EPSTEIN
INVENTOR.

BY
Herzig, Walsh & Blackham
ATTORNEYS

United States Patent Office 3,459,405
Patented Aug. 5, 1969

3,459,405
SPRING BIASED TAPERED PLUG VALVE
Saul Epstein, Los Angeles, Calif., assignor to American Metal Products Corp., Los Angeles, Calif., a corporation of California
Filed May 11, 1966, Ser. No. 549,294
Int. Cl. F16k 25/00
U.S. Cl. 251—181          6 Claims

ABSTRACT OF THE DISCLOSURE

The invention is a plug or rotor valve having a stem with a spring arranged to normally draw the rotor into its bore. Spacer means are provided whereby the rotor is non-displaceable in that it cannot be pulled out of the bore although the spring urges it into the bore. Additionally, the stem on the rotor rotates a stop washer provided with a lug which engages abutments on the valve body to provide limit stops.

---

This invention relates to a shut-off valve for controlling the flow of fluids.

The valve is of a type that may be utilized for controlling the flow of either liquids or gasses and is adapted for use in conjunction with gas burning apparatuses such as heater furnaces, stoves, and the like, but is not limited thereto.

The valve is of the plug type embodying a tapered rotor which rotates within a tapered bore of the body of the valve. The bore in the body of the valve extends all the way therethrough. The rotor or plug has a transverse bore through it, and the rotor can be turned so that this bore cooperates with bores or passageways formed in the valve body.

A desirable characteristic in a valve of this type is that the rotor be made so that it is longitudinally non-displaceable, that is, that it is not displaceable along its longitudinal axis. It is a primary object of the invention to provide an improved construction of a valve of this type whereby it is made nondisplaceable. The means for realizing this result are novel and provide for accomplishing the purpose in an extremely simple but effective way. The invention may take several of various alternative or modified forms. In a preferred form of the invention, the valve body is provided with a tapered bore which extends all the way through it. The tapered rotor has an extending cylindrical shank which extends to the outside of the bore. The shank has a flat on one side and stop washer is fitted over the shank to bear directly against the valve body at the end of the tapered bore. A coil spring is provided around the shank bearing against the stop washer and this spring is retained in position by means of a retainer washer held by a screw threaded into the extending shank. The valve is made nondisplaceable by means of spacer sleeve or cap means positioned to be retained between the stop washer and the retainer washer. This spacer means may take several forms. It may simply be a cylindrical sleeve positioned between the washers either on the inside or the outside of the coil spring. Or it may have the form of a cap-like member having an internally extending part or rib against which the outer end of the coil spring bears and which is retained by the stop washer. This cap may have an extending skirt which extends beyond the stop washer forming an enclosing housing for it.

Another feature of the invention is that fixed stops are provided which limit the opening and closing movement of the rotor in the valve body. The configuration of the valve body is such that there are provided integral surfaces for purposes of suitable stops. The stop washer turns with the rotor and it has extending tabs which engage with the said surfaces on the valve body to provide limiting positions for the opening and closing movement of the valve rotor.

Various particular objectives of the invention are realized by the construction referred to in the foregoing. The nondisplaceable characteristic is realized using a very simple construction and parts. The valve can be made to be displaceable or nondisplaceable using the same parts. The valve body itself is of a very simple construction without extending shanks or counterbores or separately formed shoulder stops. The construction is such that inadvertent or improper assembly of the rotor and retaining parts is prevented. A further advantage of the construction is that it allows the use of low cost square bar stock in fabricating the valve bodies. The caps or sleeves used to make the valve nondisplaceable can be of similar material to the rotor and may be die cast at the same time if desired. The preferred materials used may be steel for the body and washers and the rotor and the cap or sleeve may be made of aluminum. All of the parts adapt themselves readily to automatic screw machine production at low cost. The rotor or plug stops which limit rotation are obtained during the normal screw machine operation forming the valve body. This feature eliminates the need for separate machine operation to obtain the stops as is required in other gas valves. The realization of the foregoing advantages are among the objects of the invention.

Further objects and additional advantages of the invention will become apparent from the following detailed description and annexed drawings wherein.

Figure 1:
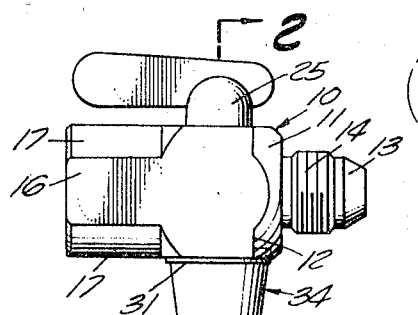
FIGURE 1 is a side view of a preferred form of the invention.

Referring now more in detail to FIGURE 1 of the drawings, there is shown a shut-off or plug valve having a body 10 having a generally rectilinear configuration with flat sides and a spherically rounded part as indicated at 11 adjacent to which there are square corners on the body as shown at 12 and 15. The body has an extending threaded nipple 13 threaded as shown at 14. Connections can be made to the threaded nipple. The valve has an extended part as shown at 16 having flat sides with the corners rounded off as shown at 17. This part of the body is internally threaded. One of the features of the invention is that the valve body may be made from square bar stock by simplified machine processes.

Figure 2:
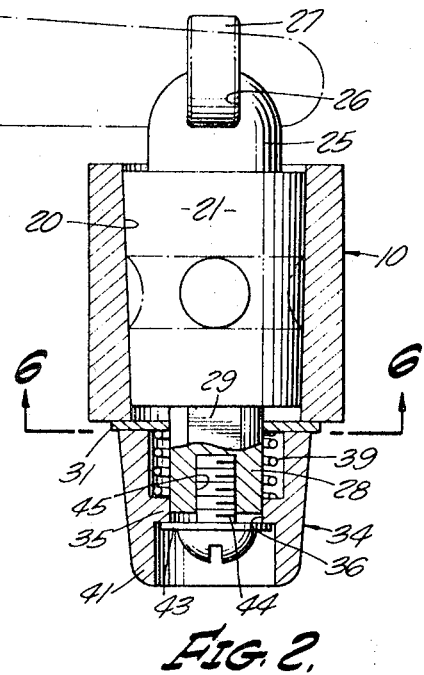
FIGURE 2 is a sectional view taken along the line 2—2 of FIGURE 1.

There is, of course, a flow passage through the body including the bore in the part 16 and in the threaded nipple 13. The body 10 has a tapered bore in it as designated at 20 in FIGURE 2, and fitting in this bore is a tapered valve member or plug 21 having a transverse cylindrical bore through it which can be brought into alignment with the bores in the part 16 and the nipple 13 of the valve body. The body can be made of brass or steel and the rotor may be preferably formed of aluminum. The rotor has an extending upper part 25 which is rounded off as shown and slotted as shown at 26 to receive a handle member 27 for rotating the rotor.

The plug 21 has an extending shank 28 which extends out of the bore 20 and this shank has a flat 29 on one or more sides. Fitted over the shank is a stop washer 31 having a circular opening having a flat on one side which engages the flat 29 whereby the washer is keyed onto the shank so as to be rotatable therewith. Numeral 34 designates an end cap having an external taper and an intermediate inwardly extending annular rib 35 providing a bore 36 within it. The cap 34 fits over the shank 28 and within the interior part of the cap is a coil spring 39, one end of which bears against the stop washer 31 and the other end of which bears against annular rib 35. The cap 34 has an outwardly extending skirt part 41 extending outwardly from the rib 35. The cap 34 is held in retaining position by means of a retainer washer 43 which bears against the annular rib 35 and which is held in position by screw 44 which is threaded into a tapped bore 45 in the end of the shank 28. As can be seen, therefore, the construction is such that the plug 20 is nondisplaceable, that is, it cannot be moved axially out of the bore being held in position by the cap 34. The spring 39 acts on the cap 34 and the shank 28 to urge the rotor into the bore and hold it therein. The parts are extremely simple ones but are so constructed that the valve cannot be improperly assembled.

Figure 6:
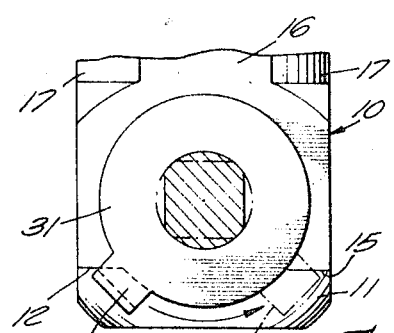
FIGURE 6 is a sectional view taken along the line 6—6 of FIGURE 2.

The stop washer 31 has a rectangular extending tab 47 as shown in FIGURE 6. The handle 27 may be rotated through approximately 90 degrees to move the valve between open and closed positions. In the open position the bore 22 is, of course, aligned with the bore in the inlet part 16 and in the nipple 13. In open and closed positions, the tab 47 on the stop washer 31 engages the flats or surfaces 12 and 15 on the valve body at the corners thereof. The valve body can be fabricated to provide the stop surfaces 12 and 15 without an additional machining operation.

Figure 3:
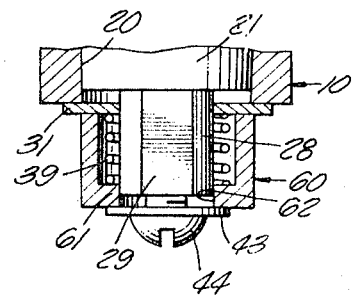
FIGURE 3 is a partial sectional view of a modified form of the invention.

FIGURE 3 shows a modified form of the invention wherein similar parts are similarly numbered. This form of the invention utilizes a modified form of cap as designated at 60. The cap is cylindrical, the outer end of it being formed inwardly as shown at 61 and providing a bore therein as shown at 62 into which the end of the shank 28 extends. The spring 39 is between the stop washer 31 and the rib 61. The retainer washer 43 engages the outside surface of the rib 61 and threads into the shank 28 as in the previous embodiment. This is a simplified construction in which a skirt is not provided as shown at 41 enclosing the retainer screw 44.

Figure 4:
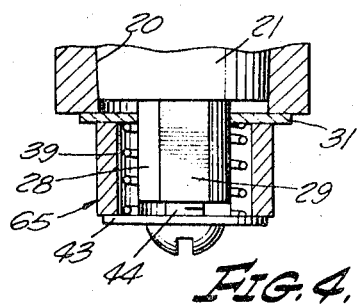
FIGURE 4 is a partial sectional view of a further modified form of the invention.

FIGURE 4 shows a modified form of the invention in which parts similar to the previous embodiments are similarly numbered. In this form of the invention, a cap is not used but, instead, a straight cylindrical sleeve 65 is provided on the outside of the coil spring 39 and forming a spacer between the stop washer 31 and the retainer washer 43. The valve of this modification operates similarly to the previous embodiment, the plug 21 being nondisplaceable and being urged into the bore 20 by the spring 39. The spring 39 is enclosed within the sleeve 65 which prevents displacement of the plug or rotor 21.

Figure 5:
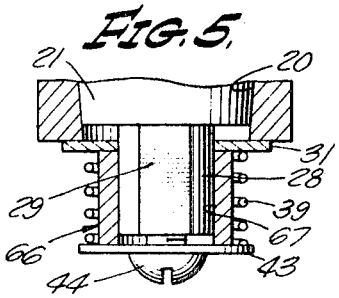
FIGURE 5 is a partial sectional view of a further modified form of the invention.

FIGURE 5 shows another modified form of the invention in which similar parts are similarly numbered. The construction in this modification is similar to that of the modification of FIGURE 4. It employs a spacer sleeve 66 which is like the sleeve 65 of FIGURE 4 except that it has a bore 67 of a size to fit snugly over the shank 28. The sleeve 66 is, therefore, on the inside of the spring 39 which is positioned between the stop washer 31 and the retainer washer 43. The valve of this modification operates similarly to the valve of the other forms of the invention.

Figure 7:
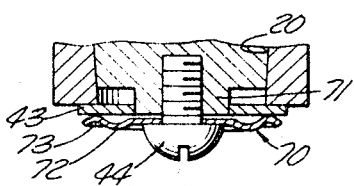
FIGURE 7 is a partial sectional view of a further modified form of the invention.

In all the foregoing embodiments, a washer type spring may be substituted for the coil spring. An example of this substitution is shown in the embodiment of the invention of FIGURE 7, which shows such a washer type spring at 70 which acts directly on the retainer washer 43. The structure of FIGURE 7 is otherwise like FIGURE 6 except that at the end of the shank 28 of the plug 21 it has a short extending part 71 of smaller diameter. The washer spring 70 is preferably of the double wave type, having two concentric waves or undulations therein as shown at 72 and 73. The washer spring may be turned either way, that is with either side against the retainer washer 43 and is held by the screw 44. As may be seen, the resiliency of washer spring 70 acting between the end of shank 28 and retainer washer 43 urges the plug into its bore.

From the foregoing, those skilled in the art will observe that the invention as described herein achieves and accomplishes all of the objects and advantages as set forth in the foregoing, as well as having many additional advantages that are apparent from the detailed description. The body may be made by simple fabrication processes from square bar stock using a screw machine, the body itself providing the appropriate surfaces suitable to serve as stops for the rotor movements. The body may be bored and reamed for the acceptance of the rotor which may be an aluminum die cast component and the sleeve may be similarly fabricated.

The foregoing disclosure is representative of preferred forms of the invention and is to be interpreted in an illustrative sense, the invention to be accorded the full scope of the claims appended hereto.

What is claimed is:
1. In a shut-off valve for controlling the flow of fluids, a body having a tapered bore, a tapered rotor nested in said tapered bore and including a handle, a shank of reduced diameter axially projecting from the rotor to the exterior of said bore, a stop washer mounted over said rotor shank bearing against said body, a separate spacer element concentric with said shank having one end bearing against said stop washer, retainer means including a screw threaded into the end of said shank and a spring retained by said retainer means and positioned to act on said shank through said retainer means to urge the rotor into said bore, said retainer means engaging said spacer element positively preventing displacement of the rotor out of the bore, said retainer means including a retainer washer through which said screw extends.

2. A valve as in claim 1 wherein said spacer element comprises a sleeve extending between said stop washer and retainer means.

3. A valve as in claim 1 wherein said spring is in the form of a coil spring around said rotor shank.

4. A valve as in claim 2 wherein said sleeve means has an inwardly extending annular part, said retainer means being positioned to bear against the outside of said part and said coil spring being positioned to bear against the inside of said extending part.

5. A valve construction as in claim 2 wherein said spring comprises a coil spring on the outside of said sleeve.

6. A valve construction as in claim 2 wherein said spring comprises a coil spring within said sleeve and fitting over said rotor shank.

References Cited

UNITED STATES PATENTS

| 491,469 | 2/1893 | Carver | 251—181 |
| 1,153,707 | 9/1915 | Russell | 251—181 X |
| 1,199,684 | 9/1916 | Forbes. | |
| 1,561,867 | 11/1925 | Larsen | 251—181 |
| 1,892,835 | 1/1933 | Hamer | 251—181 |
| 2,446,496 | 8/1948 | Tautz | 251—181 X |
| 3,171,431 | 3/1965 | Hansen | 137—454.6 |

FOREIGN PATENTS

| 500,492 | 1/1951 | Belgium. |
| 500,661 | 2/1939 | Great Britain. |

CLARENCE R. GORDON, Primary Examiner